July 7, 1936.  C. A. WOODROW  2,046,990
ELECTRICAL DISTRIBUTION SYSTEM
Filed May 17, 1932
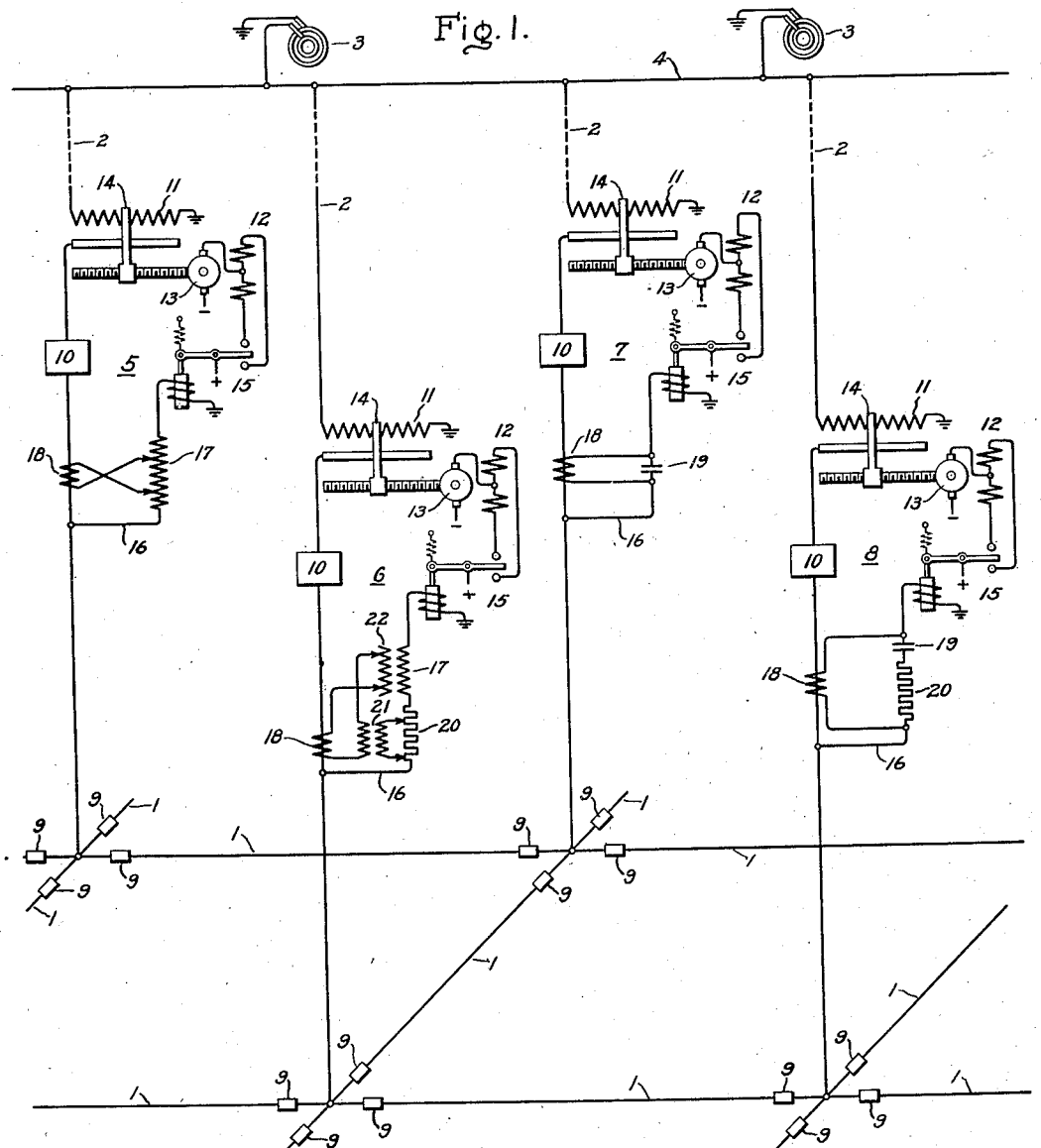
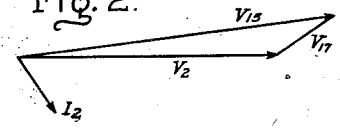
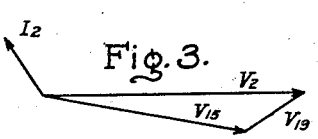
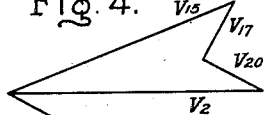
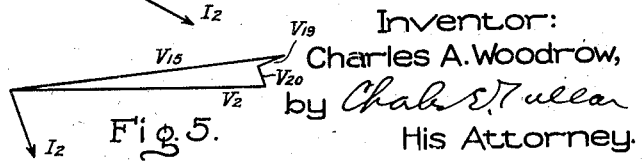
Inventor:
Charles A. Woodrow,
by Chas. E. Mullan
His Attorney.

Patented July 7, 1936

2,046,990

UNITED STATES PATENT OFFICE 2,046,990

ELECTRICAL DISTRIBUTION SYSTEM

Charles A. Woodrow, Schenectady, N. Y., assignor to General Electric Company, a corporation of New York Application May 17, 1932, Serial No. 611,795

4 Claims. (Cl. 171—119)

My invention relates to the distribution of electrical energy and more particularly to the automatic control of the voltage regulating equipment of alternating current network type distribution systems.

By a network type of distribution system is meant a system in which any load is normally supplied from at least two circuits, which may or may not be electrically parallel circuits. In a particular and extended form it consists of a grid-like network of circuits from which loads are tapped at any points and to which energy is supplied at the intersection, or connection, points of the circuits.

It is usually desirable to provide network systems with automatic voltage regulating equipment in order to maintain a highly uniform voltage throughout the network regardless of unsymmetrical and variable loading. This equipment may be of any of the several well known types and in the particular type of system in which I particularly intend to apply my invention, it comprises automatic voltage responsive ratio adjusting apparatus for voltage step down transformers which are in the supply circuits, or feeders, for the network.

Due to the fact that it is difficult, if not impossible as a practical matter, exactly uniformly to calibrate the voltage responsive main control devices for the regulating equipments, certain inequalities in voltage applied to the various network intersection points is almost inevitable. As the network idea stresses the free flow of power between intersection points the impedance of the network is purposely made low with the result that a very small voltage differential between adjacent intersections will cause the flow of heavy circulating currents. These circulating currents will flow regardless of whether the supply circuits to the network are electrically parallel or not. In cases where the supply circuits are energized from separate otherwise unconnected generators, the circulating currents will all flow through the windings of these generators. In synchronous systems this type of connection is known in the art as synchronizing at the load. In cases where the supply feeders to the network are electrically parallel the major portion of the circulating currents will usually not flow through the windings of the generators but will circulate in a loop circuit completed by the paralleling connection. However, in both cases, the circulating currents will be very low power factor lagging currents due to the relatively high reactance of the transformers, in the circuits traversed by the circulating currents, with respect to the resistance of these circuits.

In accordance with one feature of my invention, I provide electrical means for minimizing these circulating currents. Broadly speaking, I obtain this result by applying corrective voltages to the main control voltage responsive devices of the voltage regulating means for the network supply circuits, which are substantially proportional in magnitude to the supply circuit currents and which are of the proper phase relation to cause equalization of voltages applied to the network and consequently a minimization of the circulating currents. The particular means which I employ for obtaining this result will be referred to hereafter as a reactance compensator.

Another feature of my invention is the provision of means for securing an over-compounding, or line drop compensation, effect. The purpose of this is to cause the voltage regulating equipment to increase the voltage applied to the network, as the load on the network increases, thereby to compensate for the voltage drop in the supply circuits between where the voltage responsive device is connected to the system and the load supplied by the network, whereby the load voltage will be substantially constant over a wide range of load values. I obtain this result by means of what I refer to as a resistance compensator which is preferably, but not necessarily, combined with the reactance compensator.

A third feature of my invention is the automatic control of load division between supply circuits for energizing the network. In accordance with this feature of my invention, when the network is unsymmetrically loaded the supply circuits which are not nearest to the load center are made to assume their fair share of the load. This is of particular importance in increasing the reliability of the network system in that in case of failure of any supply circuits, the load division among remaining circuits is made more uniform thus decreasing the danger of overload on any circuits. Generally speaking, I obtain this result through the action of power factor differences in the network systems on my combined reactance and resistance compensator.

An object of my invention is to provide an improved system of control for the voltage regulating equipment of network distribution systems.

An additional object of my invention is to provide novel and simple means for minimizing circulating currents in network distribution systems.

Another object of my invention is to provide novel and simple means for producing an overcompounding effect in network distribution systems.

A further object of my invention is to provide novel and simple means for improving the division of load in network distribution systems.

My invention will be better understood from the following description taken in connection with the accompanying drawing, and its scope will be pointed out in the appended claims.

In the drawing, Fig. 1 is a diagrammatic illustration of a primary network system of distribution provided with various embodiments of my invention; Figs. 2 and 3 are vector diagrams for explaining the operation of my invention in preventing circulating currents, and Figs. 4 and 5 are vector diagrams for explaining the operation of my invention in producing an overcompounding effect.

In Fig. 1 is shown a network of distribution conductors 1, which is arranged to be energized through supply circuits 2 from generators 3. For the sake of simplicity I have illustrated Fig. 1 as a single phase ground return system. My invention, however, is entirely independent of the number of phases employed in the system and the various conductors of the illustrated system may equally well be considered as the conductors of one of the phases of a polyphase grounded neutral system, if desired. Generators 3 are shown interconnected by means of a conductor 4, which may be considered either a bus in a central generating station or a tie line between relatively widely separated generators. My invention, however, is not limited to an interconnection of the generators, and as the description of my invention proceeds, it will become obvious to those skilled in the art that it is equally applicable to a system in which separate, and otherwise isolated, generators are connected to each of the feeder circuits 2.

Interposed between the network conductors 1 and the supply circuit 2 are transformer substations 5, 6, 7 and 8. Each of these substations are preferably provided with protective equipment, comprising four network circuit breakers 9 and one feeder circuit breaker 10, a step-down transformer, shown as an auto-transformer 11, and a voltage regulating, or modifying, equipment 12. The voltage regulating equipment may be of any well known type and is illustrated as of the transformer ratio adjusting type having a reversible pilot motor 13 which is connected by any suitable mechanical means to operate a tap changing arm 14. Any suitable voltage responsive circuit controlling means may be provided for controlling the operation of motor 13 and, as illustrated, this means may take the form of the well known contact making voltmeter 15. The electrical conductors between the five circuit breakers of these substations are usually referred to as the substation bus, and I have shown the contact making voltmeters 15 connected to respond to the voltage of the substation bus through conductors 16. However, the voltage of the substation bus is substantially the same as the voltage of the network conductors adjacent each bus and it will be obvious to those skilled in the art that conductors 16 could be connected to the network conductors 1, if desired. It should also be understood in actual practice the voltage of the bus will be relatively high, 4000 volts for example, and that consequently in practice it will be pref- able to connect circuits 16 to the busses through an ordinary potential transformer.

Connected in the energizing circuit 16 for the contact making voltmeter 15 of substation 5 is a reactance compensator comprising an inductance 17, in which is produced a voltage drop which is proportional in magnitude to the current flow in the supply circuit 2. This voltage drop is preferably produced by means of a current transformer 18, the terminals of whose secondary windings are connected to the reactance 17 in the reverse manner in which they are usually connected to the reactance element of the usual line drop compensator employed in connection with the contact making voltmeter of ordinary feeder voltage regulators. In other words, the connection is such that if 90 degree lagging current is flowing through feeder circuit 2 towards the network the voltage drop produced in reactance 17 will be in phase with the voltage feeder circuit 2 and it will consequently be in phase with the voltage which is normally applied to the contact making voltmeter 15. If 90 degree lagging current should flow in the opposite direction, that is, from the network, or as an alternative, if the current should be leading the voltage by 90 degrees, the voltage drop produced in reactance 17 will be in phase opposition with the voltage applied to contact making voltmeter 15. The voltage drop in the reactance compensator is therefore in phase opposition with the reactance voltage drop in supply circuit 2. As hereinafter described, these relations are shown in Figures 2 and 3.

Associated with the contact making voltmeter 15 of the substation 7, I have shown a modified form of reactance compensator. This compensator comprises a capacitor 19 which is connected across the terminals of current transformer 18. The connections between current transformer 18 and capacitor 19 are such as to produce a voltage drop in the capacitor which has a phase angle, with respect to the voltage applied to the contact making voltmeter 15, which is similar to that produced by the inductance 17.

The operation of the reactance compensators associated with substations 5 and 7 for limiting circulating currents in the network system is as follows:

Assume that generators 3 are being operated in the usual manner to apply voltage to circuit 4, the supply circuit 2 and the network. Under these circumstances the contact making voltmeters 15 will operate the motors 13 in such a manner as to adjust the ratios of the transformers 11 until their secondary winding voltages are substantially equal. For example, consider substation 5. If the voltage of this substation bus should be below normal, that is to say, below the voltage value for which the contact making voltmeter 15 is calibrated to be in its balanced mid-position, the contact arm of the contact making voltmeter will make contact with its lower contact and will thereby complete an energizing circuit which will operate the motor 12 in the proper direction to change the ratio of the transformer 11 in a manner to increase the bus voltage. This action will continue until bus voltage attains its normal value when the contact making voltmeter will assume its balanced mid-position and the motor 13 will stop. On the other hand, if the voltage is too high the contact making voltmeter will contact with its upper contacts and will cause a reverse operation of the motor, thereby causing the ratio adjuster to lower the secondary voltage of the transformer 11. Such action will continue until normal voltage is attained when the contact making voltage will assume its balanced mid-position and the motor 13 will stop.

As has been explained above it is difficult, if not impractical, to calibrate all of the contact making voltmeters so uniformly as to assure an exact equalization of voltage on all of the substation buses. As a result, heavy circulating currents are often produced. For example, assume that the bus voltage of substation 5 is one-half percent above normal while the bus voltage of substation 7 is one-half percent below normal. The one percent difference in voltage between these substation buses will cause a relatively large circulating current to flow through the loop circuit including the relatively low impedance network conductor 1 joining these buses, the feeder circuits 2 and the interconnection 4. In a typical example of such a distribution system, the circulating current produced by a one percent voltage difference amounts to about a one hundred percent current, that is to say, to about full load current, in magnitude. This circulating current will be of low power factor due to the fact that the reactance of the transformers is relatively large with respect to the resistance of the path traversed by the circulating current.

Under the operating conditions assumed in the above paragraph the effect of reactance compensator 17 is illustrated in Fig. 2. In this figure $V_2$ is the voltage of supply feeder 2 and $I_2$ is the low power factor circulating current which is flowing into the network through the feeder 2. $V_{17}$ is the voltage drop in the reactance compensator 17 which is produced by this circulating current, while $V_{15}$ is the sum of $V_2$ and $V_{17}$ and represents the voltage applied to the contact making voltmeter 15. It will readily be seen from Fig. 2 that the effect of $V_{17}$ is to increase the voltage applied to the contact making voltmeter of substation 5. This in turn causes the motor 13 to change the ratio of transformer 11 in a manner to lower the voltage of the bus of substation 5. Such action obviously tends to reduce the magnitude of the circulating current as it reduces the voltage difference between the buses of substations 5 and 7.

The effect of reactance compensator 19 under the above assumed conditions is shown in Fig. 3. In this figure $V_2$ is the voltage of the feeder circuit 2 and $I_2$ is the same circulating current, which is now reversed 180 degrees in phase because the circulating current is now flowing from the network, instead of toward the network. In other words, in Fig. 3, $I_2$ is leading with respect to $V_2$ and it represents a power flow from the network. $V_{19}$ is the voltage drop produced in the reactance compensator 19 and $V_{15}$ is the voltage applied to the contact making voltmeter 15 of substation 7. This voltage is obviously less than the voltage of the feeder circuit and consequently the contact making voltmeter will act to cause the motor 13 to increase the voltage of the feeder circuit. This also has the effect of reducing the magnitude of the circulating current.

If the voltage of the bus of substation 7 should be higher than the voltage of the bus of substation 5, exactly the reverse action would take place and Fig. 2 would represent conditions in substation 7, $V_{17}$ in Fig. 2 representing the voltage drop in reactance compensator 19. Similarly, Fig. 3 would represent conditions in substation 5 and $V_{19}$ would represent the voltage drop in reactance compensator 17.

Substation 8 differs from substation 7 in that a resistance compensator 20 has been added to the capacitor type reactance compensator. The purpose of the resistance compensator 20 is to produce a desirable over-compounding, or line drop compensation, effect. This action is as follows: During light load conditions its effect is negligible because the current under such conditions is of relatively low power factor and consequently the voltage drop across resistance 20 will be substantially in quadrature with the voltage applied to the contact making voltmeter and will have little or no effect thereon. However, as the load increases on the network the power factor necessarily improves and resistance compensator 20 is so connected to current transformer 18 that as this happens the voltage drop across the resistance compensator 20 becomes more and more in phase opposition with the voltage applied to the contact making voltmeter 15. This tends to lower the voltage applied to the contact making voltmeter thereby causing the voltage regulating equipment to raise the voltage. This action in raising the voltage compensates for the voltage drop in the supply circuit between the generator 3 and any load connected to the network so that, for a particular reactance compensator setting, by properly adjusting the value of resistance 20 the voltage applied to the load may be made substantially constant regardless of its magnitude.

In substation 6 the compensating arrangement comprises the inductive reactance compensator 17 and the resistance compensator 20, and this combination is energized from the current transformer 18 inductively rather than conductively. As shown, an insulating transformer 21 is provided for producing the voltage drop in resistance 20 while a winding 22 serves to induce the proper voltage in the inductive reactance 17. The effect of the resistance compensator 20 in substation 6 is the same as in substation 8.

Fig. 4 illustrates the overcompounding action of the combined reactance and resistance compensator of substation 6 when the load and power factor is relatively high. In this figure $V_2$ is the voltage of the supply feeder of substation 6, $I_2$ is the relatively heavy, high power factor, load current, $V_{20}$ and $V_{17}$ the voltages of the resistance and reactance compensators respectively, and $V_{15}$ is the voltage applied to the contact making voltmeter. By proper proportioning of the resistance 20 and reactance 17 the voltage $V_{15}$ may be made less than the voltage $V_2$ under the current and power factor conditions shown in Fig. 4 and consequently the voltage regulating equipment will act to raise the voltage and thus compensate for the voltage drop in the supply circuit. It will be seen in Fig. 4 that it is the voltage drop in the resistance compensator 20 which has the greatest effect in producing the difference between $V_2$ and $V_{15}$. The effect of this voltage drop increases as the load and power factor increases.

In Fig. 5 is shown the effect of the combined resistance and reactance compensator, for substation 8, during light load conditions. As shown, the power factor is low and the voltage $V_{19}$ across the capacitor is nearly in phase with the voltage $V_2$, while the voltage $V_{20}$ across the resistance is nearly in quadrature with the voltage $V_2$. Thus the voltage $V_{15}$ is higher than voltage $V_2$.

It should be understood that during heavy and light load conditions on substations 8 and 6 respectively, Fig. 4 would illustrate conditions in substation 8, and Fig. 5 would illustrate conditions in substation 6, with the compensator voltage labels reversed.

Figs. 4 and 5 show that during relatively heavy load conditions on the network the combined reactance and resistance compensators act predominately as a resistance compensator and produces an overcompounding effect, whereas during light load low power factor conditions the reactance portion of the combined compensator produces a predominate effect which causes the voltage regulating equipment to lower the voltage, when lagging current is flowing.

The effects outlined in the preceding paragraph result in another advantageous action in the network. This action is such as to tend to make the various supply circuits share an unsymmetrically applied, or unbalanced, load equally. For example, suppose a relatively heavy load at lagging power factor is applied to the left hand lowermost network conductor 1, as the network is viewed in the drawing. Under these circumstances the power factor of the current flowing to the network through substation 6 will be lower than the power factor of the current flowing to the network through the substation 8. This is because the current supplied through the substation 8 must flow through the center lowermost network conductor 1 and this has a relatively high ratio of resistance to reactance with respect to the ratio of resistance to reactance of the supply circuit, which includes the transformer 11. This power factor difference becomes increasingly pronounced as the length of the conductor 1 is increased. As has previously been explained, the result of this power factor difference is that the voltage applied to the contact making voltmeter for substation 6 will be higher than the voltage applied to the contact making voltmeter of substation 8. Therefore, the voltage regulating equipment in each substation will tend to act so as to cause the voltage applied to the network through substation 8 to be higher than the voltage applied to the network through substation 6. The effect of this is to make substation 8 carry an increased proportion of the load, which is assumed to be applied to the left-hand lowermost conductor 1. The reason that this effects such a load distribution is as follows:

As has previously been explained, the unequalization of the bus voltage of substations 6 and 8 will cause a low power factor circulating current to flow. Due to the fact that the voltage of substation 8 is higher than the voltage of substation 6 the quadrature component of this circulating current will be leading in substation 6 and lagging in substation 8 while the watt component of this current will be 180 degrees out of phase in substation 6 and in phase in substation 8. Consequently, the quadrature and watt components of this circulating current will subtract from the quadrature lagging and the watt components, respectively, of the load current in substation 6, thereby reducing the effective load on this substation. Similarly, the components of the circulating current in substation 8 will add to the corresponding components of the load current in substation 8, thereby increasing the effective load on this substation.

While I have shown and described particular embodiments of my invention, it will be obvious to those skilled in the art that changes and modifications may be made without departing from my invention, and I therefore aim in the appended claims to cover all such changes and modifications.

What I claim as new and desire to secure by Letters Patent of the United States is:

1. In an electrical distribution system, an alternating current supply circuit, means for regulating the voltage of said circuit including a circuit connected to be responsive to the voltage of said supply circuit, a capacitor connected in said voltage responsive circuit, and means for passing through said capacitor a current proportional to the current in said supply circuit.

2. In combination, an alternating current supply circuit, means for applying a voltage to said circuit, means for regulating the voltage of said circuit including a circuit connected to be responsive to the voltage of said supply circuit, a capacitor connected in said voltage responsive circuit, and means for producing a voltage drop across said capacitor which varies in magnitude and phase with the current in said supply circuit and which is in phase with the voltage applied to said voltage responsive circuit when said current is lagging the voltage applied to said supply circuit by ninety degrees.

3. In a compensating system for an alternating current distribution system, an alternating current supply circuit, automatic voltage regulating means therefor including a circuit connected to be responsive to the voltage of said supply circuit, compensating means comprising a resistance element and a capacitor connected in said voltage responsive circuit, and means for passing a current through said resistance element and said capacitor which varies in magnitude and phase with a current derived from the current in said supply circuit.

4. In a compensating system for an alternating current distribution system, an alternating current supply circuit, automatic voltage regulating means therefor including a circuit connected to be responsive to the voltage of said supply circuit, compensating means comprising a resistance element and a capacitor connected in said voltage responsive circuit, and means for passing a current through said resistance element and said capacitor which varies in magnitude and phase with a current derived from said supply circuit.

CHARLES A. WOODROW.